United States Patent
Sugie

(10) Patent No.: US 6,847,857 B2
(45) Date of Patent: Jan. 25, 2005

(54) THREAD MACHINING CONTROL METHOD AND APPARATUS THEREFOR

(75) Inventor: Masayuki Sugie, Tokyo (JP)

(73) Assignee: Okuma Corporation, Aichi (JP)

( * ) Notice: Subject to any disclaimer, the term of this patent is extended or adjusted under 35 U.S.C. 154(b) by 0 days.

(21) Appl. No.: 10/731,948

(22) Filed: Dec. 9, 2003

(65) Prior Publication Data
US 2004/0128018 A1 Jul. 1, 2004

(30) Foreign Application Priority Data
Dec. 27, 2002 (JP) ........................................ 2002-379109

(51) Int. Cl.$^7$ .............................................. G06F 19/00
(52) U.S. Cl. ........................ 700/160; 700/193; 318/571
(58) Field of Search ................................. 700/159–160, 700/169–170, 174, 188, 193; 318/571, 568.22; 409/65–67

(56) References Cited

U.S. PATENT DOCUMENTS

| 4,873,793 A | * | 10/1989 | Asano et al. .................. 451/5 |
| 4,902,951 A | * | 2/1990 | Ohta et al. ................... 318/632 |
| 5,910,199 A | * | 6/1999 | Busick et al. ................. 82/1.11 |
| 6,111,382 A | * | 8/2000 | Tsutsui ....................... 318/571 |
| 6,147,468 A | * | 11/2000 | Hamamura et al. ......... 318/625 |

FOREIGN PATENT DOCUMENTS

| JP | 49-105277 | 10/1974 |
| JP | 2000-126991 | 5/2000 |

* cited by examiner

Primary Examiner—Leo Picard
Assistant Examiner—Zoila Cabrera
(74) Attorney, Agent, or Firm—Ladas & Parry LLP

(57) ABSTRACT

It is strongly demanded that a stable thread machining process be attained by carrying out a thread machining operation while varying the rotational frequency of a spindle, and thereby restraining the occurrence of cutting chatter. According to the present invention, in which a thread machining process is carried out on the basis of a rotation of the spindle and a movement of a feed axis, the above-mentioned demand is met by executing the steps of determining a relative phase error of the spindle positions and feed axis during a thread machining operation, and determining a movement quantity of the feed axis on the basis of a pseudo spindle position set by error-compensating the quantity of the relative phase error with respect to the spindle position.

9 Claims, 4 Drawing Sheets

THREAD MACHINING CONTROL METHOD AND APPARATUS THEREFOR

BACKGROUND OF THE INVENTION

1. Field of the Invention

The present invention relates to a thread machining control method for numerically controlled machine tools, and a thread machining apparatus.

2. Description of the Related Art

A related art thread machining control method is adapted to rotate a spindle in accordance with a spindle rotational number command S, determines a movement quantity of a feed axis by multiplying a rotational angle of the spindle by a screw pitch command P after the spindle reaches a predetermined position M (generally called a "marker position"), and thereby drives and controls the spindle. In short, the feed axis is controlled as a slave shaft with a speed of the spindle used as a master.

The related techniques will now be described with reference to a block diagram of FIG. 1.

A spindle 6 is rotated and controlled via a spindle speed controller 5 on the basis of a spindle rotational number command S given by a processing program. A spindle position detecting section 8 detects a spindle position APA-S by using a detection signal outputted from a spindle position detector (PG; pulse generator) 7. When a thread machining command C is analyzed by subjecting a processing program to an analysis in a program analyzing section 1, a thread machining command C including the screw pitch data P is sent out to a thread machining control section 2. After a predetermined rotational angle (marker position) is attained on the basis of the spindle position APA-S outputted from the spindle position detecting section 8, the thread machining control section 2 starts a thread machining process. The thread machining control section 2 then determines a movement quantity $\Delta Z$ of the feed axis (Z-axis) which is obtained by multiplying a variation quantity $\Delta APA\text{-}S$ of the spindle position APA-S by the screw pitch data P, and sends out the movement quantity $\Delta Z$ to a Z-axis position controller 3. The Z-axis position controller 3 positions and controls the Z-axis 4 on the basis of the inputted feed axis movement quantity $\Delta Z$.

According to the above-described related techniques, the feed axis is controlled as a slave shaft with the spindle speed used as a master. Therefore, when a thread machining operation is carried out with the spindle driven with a predetermined rotational number, the spindle and Z-axis are moved with the speed of the spindle and a relative speed of the Z-axis kept in a predetermined relation, so that a thread machining process of a high processing accuracy can be conducted. However, when a screw cutter of a formed shape, such as a thread machining tool (bit) is used, cutting chatter is liable to occur in general, so that a stable cutting process cannot be carried out.

The processing techniques which eliminate such cutting chatter, and which are capable of carrying out a stable thread machining process by conducting the process while varying a rotational number of the spindle, have heretofore been known (Japanese Patent Application Laid-open No.49-105277 A). However, when the rotational number of the spindle is varied in a thread machining process, an acceleration/deceleration error of a slave shaft varies, and a phase error occurs in the relation between the position of the spindle and that of the feed axis, so that a thread machining accuracy markedly decreases. Therefore, the alteration of the rotational number of the spindle could not be carried out in the thread machining process (Japanese Patent Application No.2000-126991 A).

These problems will be described complementarily with reference to the time charts shown in FIGS. 2A and 2B.

When the spindle is operated at a rotational speed $Sv_1$ as shown in FIG. 2A with the spindle then reaching a predetermined position (marker position), the feed axis is moved in accordance with a speed command $Zv_1$ which is obtained by multiplying a rotational movement quantity of the spindle by a predetermined screw pitch. When the spindle is then moved at a speed $Sv_2$ by changing the speed of the spindle represented by a rotational number thereof with the spindle then reaching a predetermined position (marker position) in the same manner, the feed axis is necessarily moved in accordance with a speed command $Zv_2$ obtained by multiplying a rotational movement quantity of the spindle by a predetermined screw pitch.

A rise of the speed of the feed axis (Z-axis) shows that the feed axis starts being moved at a time "a" at which the spindle reaches a predetermined position (marker position) as shown in FIG. 2B. The acceleration processing of the feed axis (Z-axis) is carried out by an acceleration/deceleration constant Tz thereof toward the speed command $Zv_1$ or $Zv_2$. When the feed axis is accelerated toward the speed command $Zv_1$ in the above process, a triangle "abc" represents a following delay quantity of the feed axis with respect to the position of the spindle, and, when the feed axis is accelerated toward the speed command $Zv_2$, a triangle "ab'c'" represents the same. The above following delay quantity causes a difference in relation between the position of the spindle and that of the feed axis to occur, and consequently, a phase difference between the positions of leads of a screw to occur during a thread machining process. In short, when the speed of the spindle is varied, the speed of the feed axis also varies, so that the following delay quantity of the feed axis varies. This causes the accuracy of the thread machining pitch to be deteriorated.

SUMMARY OF THE INVENTION

The present invention has been made in view of the above-described circumstances, and one of the objects thereof resides in providing thread machining control method and apparatus therefor capable of attaining a stable thread machining process even when a speed of a spindle is varied.

The present invention relates to a thread machining control method for numerically controlled machine tools, and the above object of the present invention is to provide a thread machining control method for a thread machining apparatus adapted to carry out a thread machining process, which is provided with a spindle rotating and controlling means for rotating a spindle in accordance with a spindle rotational number command S, a means for detecting a position APA-S of the spindle, and a feed axis driving and controlling means for determining an actual quantity $\Delta S$ of a spindle rotational movement obtained by the spindle position detecting means, and a movement quantity of the feed axis on the basis of the screw pitch command P, and which is adapted to carry out a thread machining process in accordance with the rotation of the spindle and the movement of the feed axis, the object of the present invention being attained by determining a relative phase error, which occurs during a thread machining operation, of a spindle position APA-S and a feed axis position Z on the basis of the spindle position APA-S, and determining a movement quantity of the feed axis on the basis of a pseudo spindle position APA-S' in which the relative phase error quantity is compensated with respect to the spindle position APA-S.

The present invention relates to a thread machining apparatus, and the above object of the present invention is to provide a thread machining apparatus which is provided with a spindle rotating and controlling means for rotating a spindle in accordance with a spindle rotational number command S, a means for detecting a position APA-S of the spindle, and a feed axis driving and controlling means for determining an actual rotational movement quantity ΔS of the spindle obtained by the spindle position detecting means, and a movement quantity of the feed axis on the basis of the screw pitch command P, and which is adapted to carry out a thread machining process owing to the rotation of the spindle and the movement of the feed axis, and which is adapted to carry out a thread machining process, the object of the present invention being attained by providing a means for determining an actual rotational number $Sv_n$ of the spindle on the basis of a rotational movement quantity ΔS of the spindle, a means for determining a feed axis movement speed command Zv of the feed axis on the basis of the actual rotational frequency $Sv_n$ and screw pitch command P, a means for determining an acceleration/deceleration following error εz, which occurs correlatively to a feed axis movement speed, on the basis of the movement speed command Zv and time constant Tz for accelerating/decelerating the feed axis, a phase error compensating value calculating means for determining a relative phase error εs, which is converted into a spindle position, on the basis of the acceleration/deceleration following error εz, and a subtraction means for determining a pseudo spindle position APA-S' by subtracting the relative phase error εs from the spindle position APA-S; and by determining a movement quantity of the feed axis on the basis of the pseudo spindle position APA-S' and screw pitch command P.

DETAILED DESCRIPTION OF THE PREFERRED EMBODIMENTS

Figure 1:
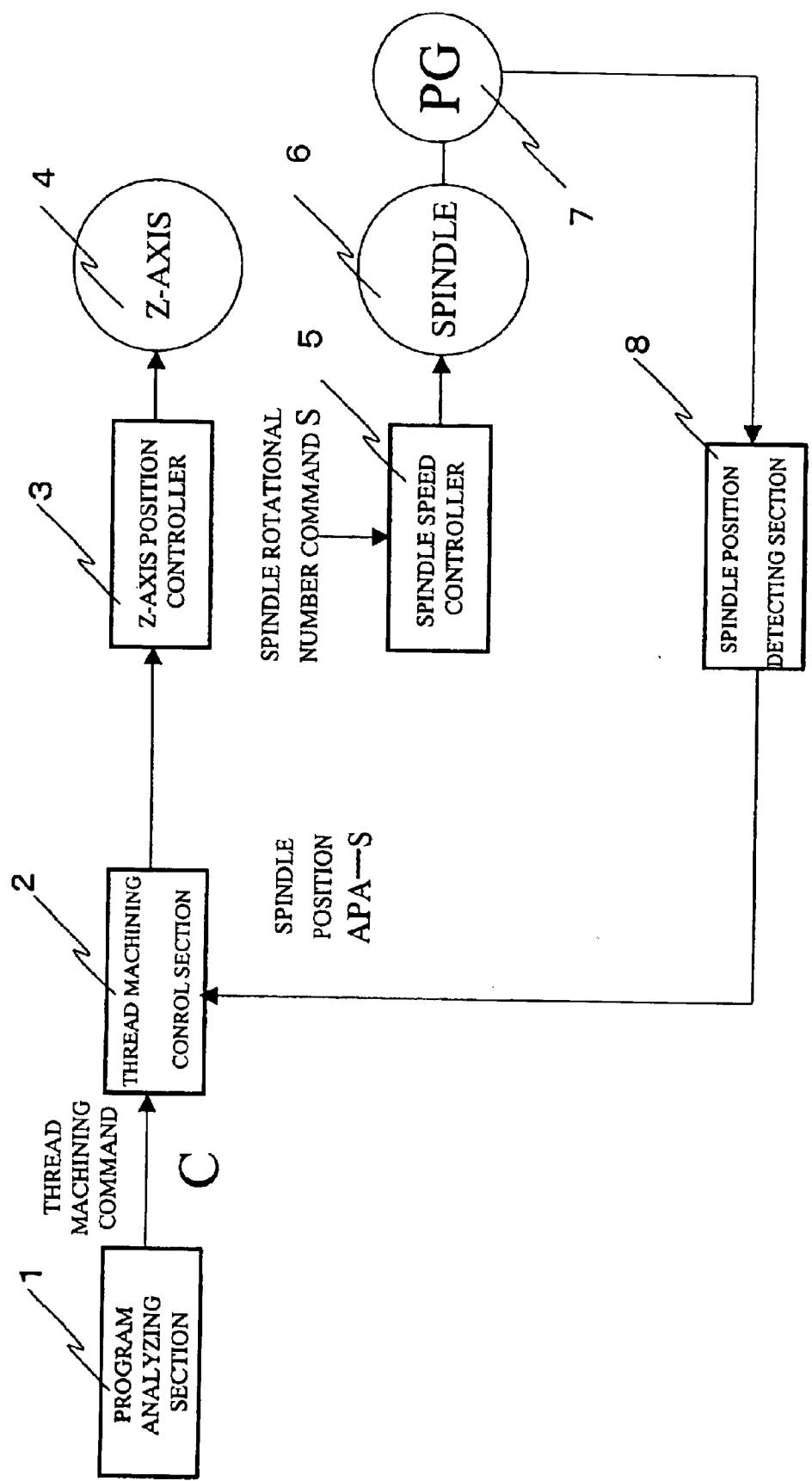
FIG. 1 is a block diagram showing an example of a related art thread machining apparatus.
Figure 2:
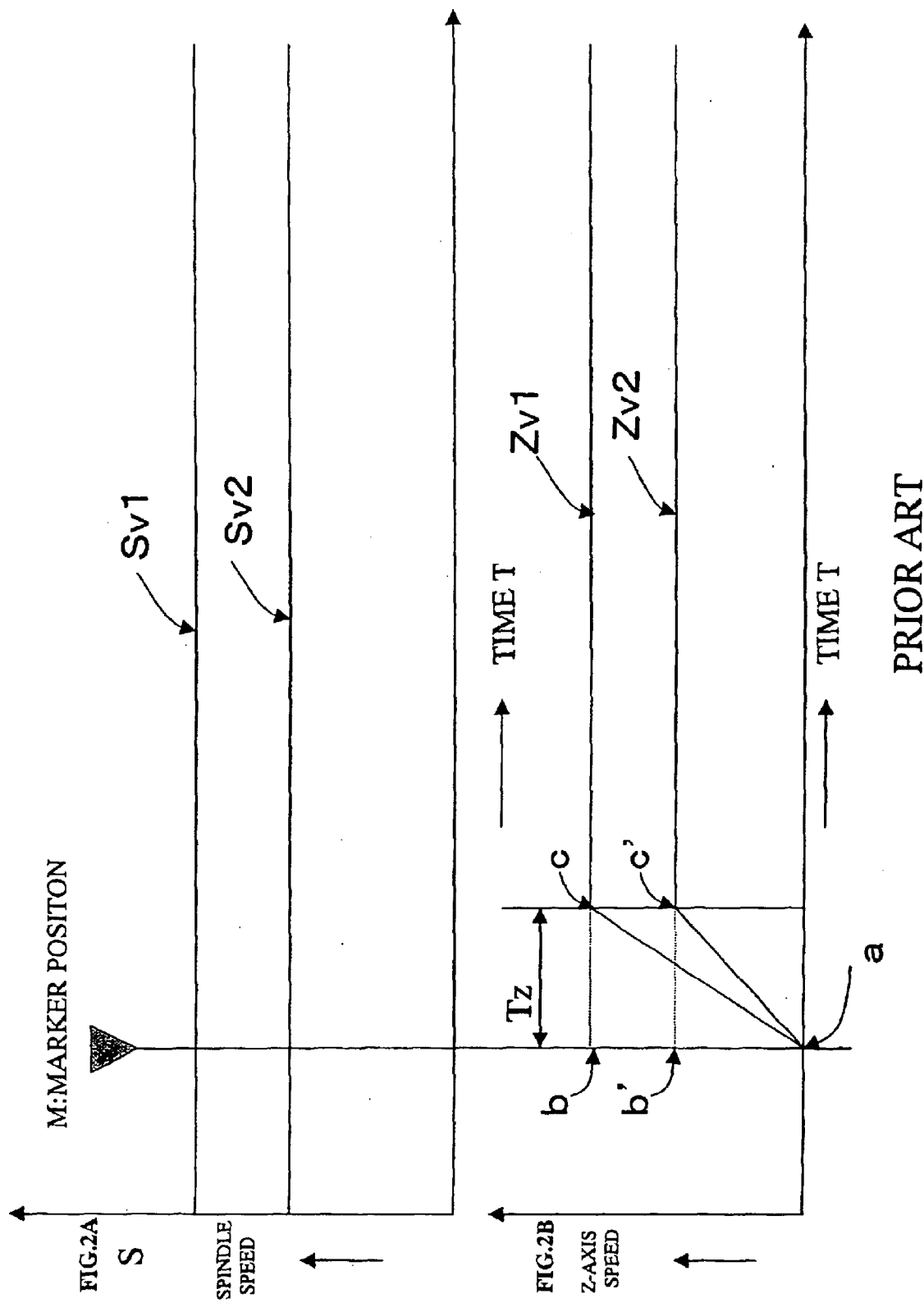
FIGS. 2A and 2B are time charts showing an example of a control operation for a related art thread machining process.

When a spindle is rotated and a phase difference between the phase of a spindle and that of a position of a Z-axis having a predetermined position (marker position) as a starting point is set to zero, a general equation of the phase difference εz occurring when the spindle is moved from the predetermined position to a position in which the Z-axis accelerated reaches a steady speed comes to be the following equation (1).

$$\epsilon z = Sv \times P \times Tz/2 \qquad (1)$$

wherein "Sv" represents an actual rotational number of the spindle; "P" a screw pitch; and "Tz" a Z-axis acceleration/deceleration constant, the actual rotational number Sv of the spindle being determined on the basis a variation quantity of a spindle position APA-S.

Therefore, in order to stand the Z-axis so that the phase difference between the phase of the position of the spindle and that of the position of the Z-axis having the marker position as a starting point becomes zero, the marker position is compensated and controlled by an angle corresponding to the phase difference εz, the Z-axis position being thereby synchronized with the marker position with respect to a position level.

A general equation of the compensation angle εs can be determined in accordance with the following equation (2).

$$\begin{aligned}\epsilon s &= 360 \times \epsilon z / P \\ &= 360 \times [Sv \times P \times Tz/2]/P \\ &= 360 \times Sv \times Tz/2\end{aligned} \qquad (2)$$

wherein "360" represents a movement angle (unit: degree) corresponding to one turn of the spindle.

A phase difference εz' between the phase of the spindle position APA-S at an actual rotational number $Sv_n$ (n=1, 2, . . . ) of the spindle which is obtained by varying [spindle rotational number command S×overriding value] a spindle rotational number command S by using a spindle overriding switch and that of the Z-axis can be determined in accordance with the following equation (3).

$$\epsilon z' = Sv_n \times P \times Tz/2 \qquad (3)$$

A phase difference εs' obtained by converting the phase difference εz' between the spindle position APA-S and the Z-axis position into a spindle position can be determined in accordance with the following equation (4) on the basis of the above-mentioned equations (2) and (3).

$$\begin{aligned}\epsilon s' &= 360 \times \epsilon z' / P \\ &= 360 \times [Sv_n \times P \times Tz/2]/P \\ &= 360 \times Sv_n \times Tz/2\end{aligned} \qquad (4)$$

Therefore, the occurrence of a phase difference between the spindle position APA-S and the feed axis position can be prevented by utilizing the results of the execution of the steps of detecting the condition of the actual spindle rotational number $SV_n$, determining the phase difference εs' obtained by converting the spindle position into the marker position in accordance with the above equation (4), determining a pseudo spindle position APA-S' obtained by adding the phase difference εs' to the spindle position APA-S, and determining the movement quantity of the feed axis on the basis of the pseudo spindle position APA-S'.

Figure 3:
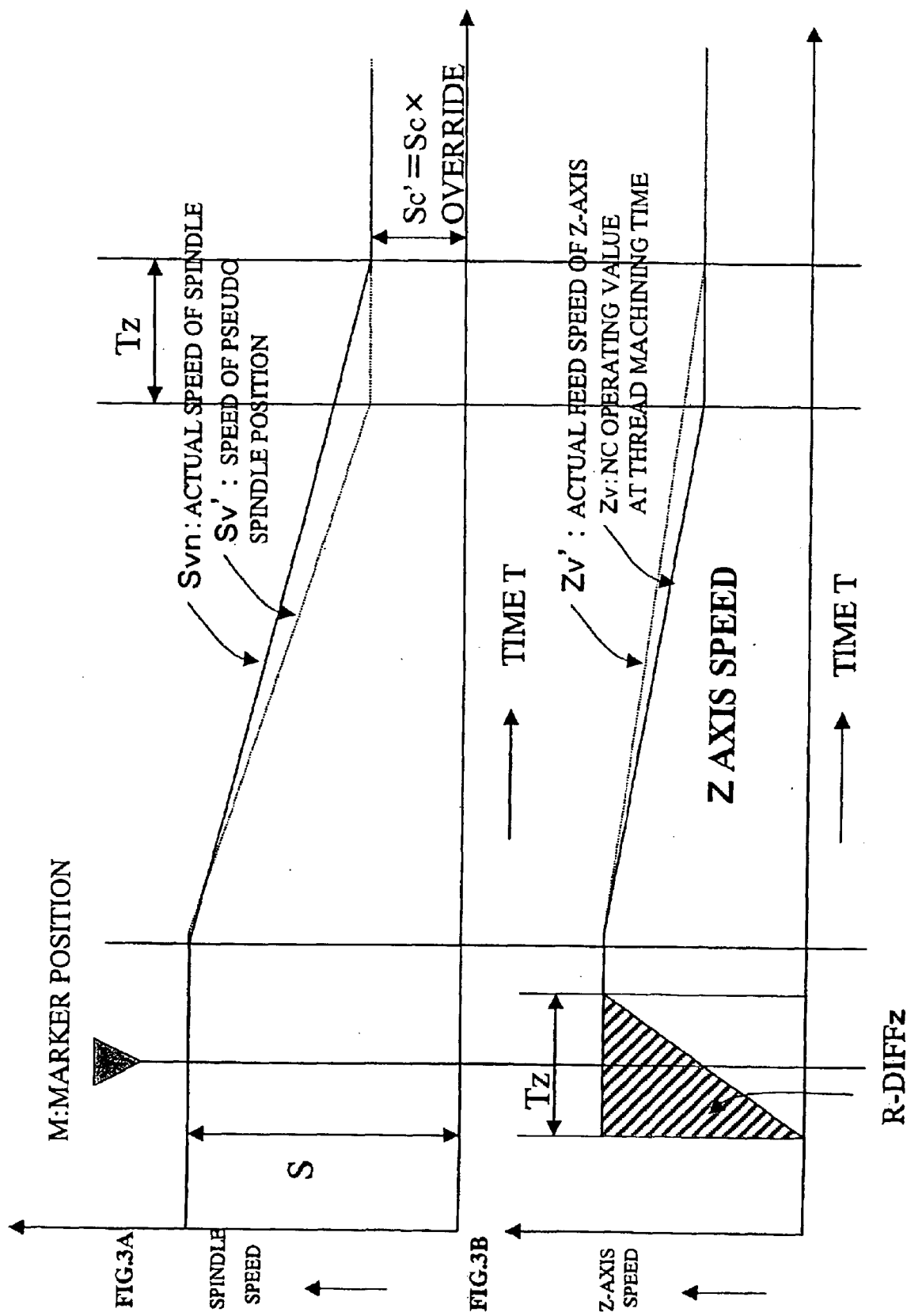
FIGS. 3A and 3B are time charts showing an example of a control operation according to the present invention.

FIGS. 3A and 3B are time charts showing an example of an operation of the above-described invention, and the example of the operation will be described. When the spindle overriding switch is altered while the spindle is rotated in accordance with the spindle rotational number command S as shown in FIG. 3A, the spindle rotational number command changes into "the spindle rotational number command S×overriding value", and an actual spindle speed $Sv_n$ is gradually reduced and controlled toward "the spindle rotational number command S×overriding level". The pseudo spindle position APA-S' comes to have a speed to which a phase difference calculated on the basis of the actual spindle speed $Sv_n$ is added, and, during the deceleration time, the speed Sv' (speed of the pseudo spindle position) of the pseudo spindle position APA-S' is decelerated earlier (in a phase-advanced condition) than the actual speed of the spindle as shown in the drawings. According to the present invention, the spindle rotational number and the spindle speed are used as terms of substantially the same meaning.

On the other hand, since the feed axis (Z-axis) starts being operated on the basis of the pseudo spindle position APA-S', the operation of the feed axis is started before the spindle reaches a predetermined position. This means that the operation of the feed axis is started at a time Tz/2 before the spindle is rotated and reaches a predetermined position (marker position) as shown in the above-mentioned equation (2).

When the pseudo spindle speed is reduced, the variation of the pseudo spindle is also reduced, so that the movement speed command Zv of the feed axis is also reduced as shown in FIG. 3B. Since the actual feed axis (Z-axis) speed Zv' is delayed by a period of time corresponding to the acceleration/deceleration constant, the actual feed speed Zv' of the Z-axis becomes a level at which the position and the phase difference of the Z-axis are synchronized with those of the actual speed $Sv_n$ of the spindle. This enables the thread machining process in which a difference in position and phase of the actual spindle and feed axis does not occur during the thread machining operation to be attained.

Figure 4:
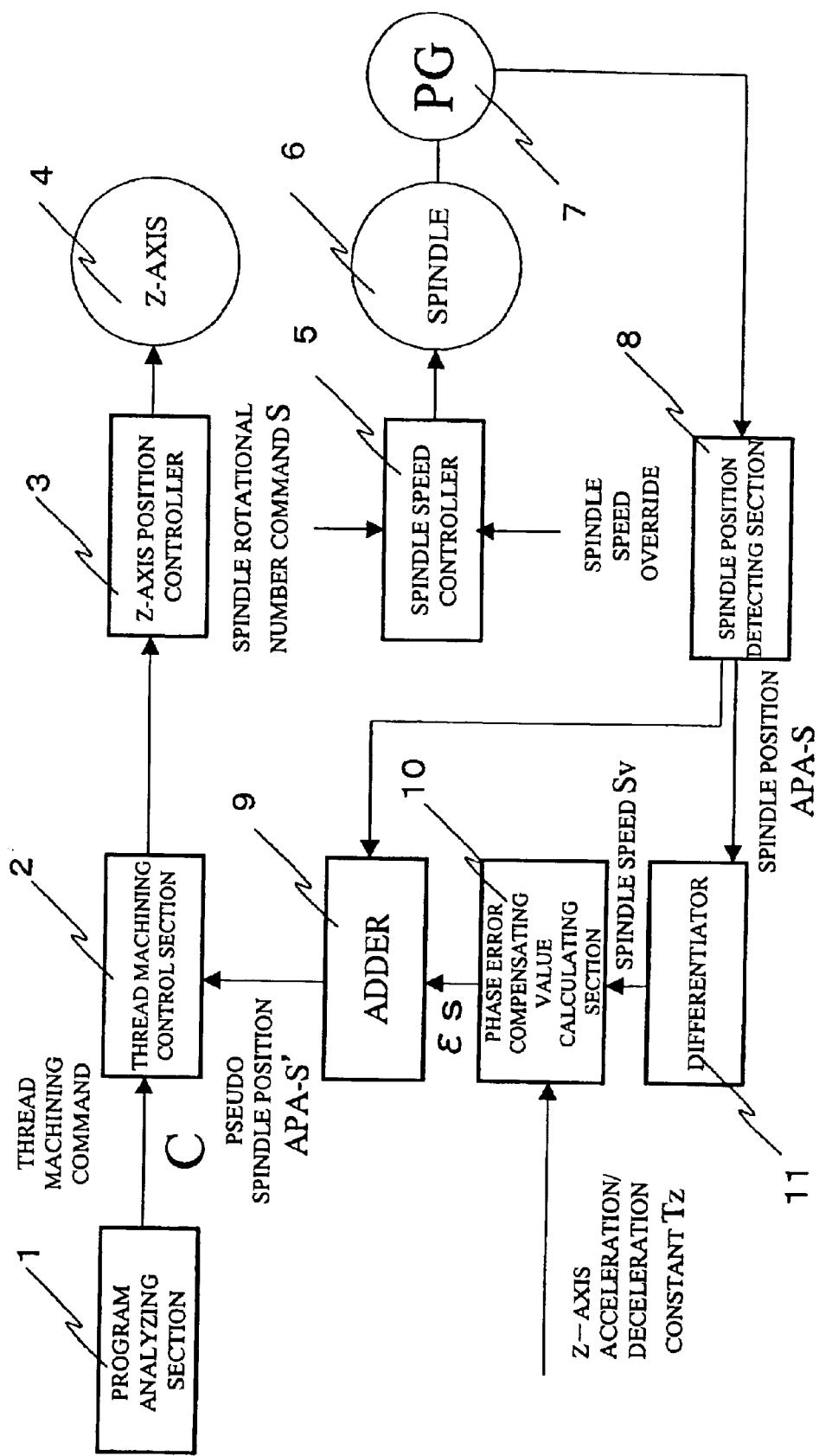
FIG. 4 is a block diagram showing an embodiment of the thread machining apparatus according to the present invention.

An embodiment of the present invention will be described with reference to the block diagram of FIG. 4. A description of the constitution of the embodiment which is identical with that the related art example (FIG. 1) will be omitted.

In a spindle speed controller 5, a spindle speed overriding switch is altered and set in accordance with a spindle rotational number command S by an operator (not shown), and the spindle controller 5 rotates and controls a spindle 6 at a spindle speed obtained by the multiplication of a spindle overriding signal determined by the altered spindle speed overriding switch. When a spindle position APA-S, a detection signal from a spindle position detector (PG) 7 is detected via a spindle position detecting section 8, an actual speed $Sv_n$ of the spindle is determined by a differentiator 11. In a phase error compensating value calculating section 10, a phase difference εs' is determined on the basis of the actual speed $Sv_n$ of the spindle and a preset acceleration/deceleration constant Tz of a feed axis (Z-axis) by using the above-mentioned equation (4). An adder 9 adds the spindle position APA-S outputted from the spindle position detecting section 8 and the phase difference εs' to each other, and determines a pseudo spindle position APA-S'. A thread machining control section 2 starts a thread machining process on the basis of the pseudo spindle position APA-S' after a predetermined angle of rotation (marker position) is attained, and a movement quantity ΔZ of the feed axis (Z-axis) obtained by multiplying a variation quantity ΔAPA-S' of the pseudo spindle position APA-S' by screw pitch data P is then determined, the movement quantity ΔZ being sent out to a Z-axis position controller 3.

In this embodiment, the transmission of the spindle speed overriding signal to the spindle speed controller 5 is carried out by the alteration of the spindle speed overriding switch executed by the operator, and the speed of the spindle rotational number command S is made to fluctuate in a predetermined cycle. Therefore, when a spindle speed command varying means for varying and controlling the spindle speed overriding signal relatively to the time and amplitude, an identical control operation can be attained without passing through the operator's action.

According to the present invention, a thread machining process can be carried out without causing a phase difference between the positions of the spindle and feed axis to occur even when the spindle speed is made to fluctuate. This enables a stable thread machining process to be attained effectively without causing cutting chatter to occur.

Moreover, since a thread machining process can be carried out even when the spindle rotational number is varied, the rotational number with which a coarse thread machining process having a large processing load is carried out and that with which a finishing thread machining process is carried out can be set to changed levels, so that an efficient, highly accurate thread machining process can also be attained.

What is claimed is:

1. A thread machining control method for a thread machining apparatus which is provided with a spindle rotating and controlling means for rotating a spindle in accordance with a spindle rotational number command, a detecting means for detecting a position of the spindle, and a feed axis driving and controlling means adapted to determine a movement quantity of a feed axis on the basis of an actual rotational movement quantity of the spindle obtained by the spindle position detecting means and a screw pitch command, and to drive and control the feed axis, and which carries out a thread machining process by the rotation of the spindle and the movement of the feed axis, characterized in that:

a relative phase error of the spindle position and feed axis position occurring during the thread machining operation is determined in the spindle position, the movement quantity of the feed axis being determined on the basis of a pseudo spindle position in which a relative phase error quantity is compensated with respect to the spindle position.

2. A thread machining control method according to claim 1, wherein the spindle position in which the relative phase error is determined indicates a rotation angle.

3. A thread machining control method according to claim 1, wherein the feed axis is a Z-axis, which is positioned and controlled on the basis of a movement quantity of the feed axis obtained by multiplying a variation quantity of the spindle position by a screw pitch.

4. A thread machining control method according to claim 3, wherein the relative phase error quantity is determined in accordance with the following equation:

$$\epsilon s' = 360 \times Sv_n \times Tz/2$$

wherein "360" represents a movement angle corresponding to one turn of the spindle; "$Sv_n$" an actual spindle rotational number obtained by varying the spindle rotational number command by using a spindle overriding switch; and "Tz" a Z-axis acceleration/deceleration constant.

5. A thread machining apparatus which is provided with a spindle rotating and controlling means for rotating a spindle in accordance with a spindle rotational number command (S), a detecting means for detecting a position (APA-S) of the spindle, and a feed axis driving control means for determining an actual rotational movement quantity (ΔS) of the spindle obtained by the spindle position detecting means, and a movement quantity of the feed axis on the basis of the screw pitch command (P), and which is adapted to carry out a thread machining process in accordance with a rotation of the spindle and a movement of the feed axis, characterized in that:

the apparatus includes a means for determining an actual rotational number ($Sv_n$) of the spindle on the basis of a rotational movement quantity (ΔS) of the spindle, a means for determining a movement speed command (Zv) of the feed axis on the basis of the actual rotational number ($Sv_n$) and screw pitch command (P), a means for determining an acceleration/deceleration following error (εz), which occurs correlatively to the feed axis movement speed, on the basis of a movement speed command (Zv) and a time constant (Tz) for accelerating/decelerating the feed axis, a phase error compensating value calculating means for determining a relative phase error (εs), which is converted into a spindle position, on the basis of the acceleration/deceleration following error (εz), and a subtraction means for determining a pseudo spindle position (APA-S') by subtracting the relative phase error (εs) from the spindle position (APA-S); and determines a movement quantity of the feed axis on the basis of the pseudo spindle position (APA-S') and screw pitch command (P).

6. A thread machining apparatus according to claim 5, wherein the spindle rotational number (S) is varied by altering a spindle speed overriding switch.

7. A thread machining apparatus according to claim 5, wherein the apparatus is provided with a spindle speed command varying means for subjecting the spindle rotational number command (S) to speed fluctuation in a predetermined cycle.

8. A thread machining apparatus according to claim 5, wherein the acceleration/deceleration following error determining means is adapted to execute the following equation:

$$\epsilon z = Sv \times P \times Tz/2$$

wherein "Sv" represents an actual rotational number of the spindle; "P" a screw pitch; and "Tz" a Z-axis acceleration/deceleration constant.

9. A thread machining apparatus according to claim 5, wherein the phase error compensating value calculating means is adapted to execute the following equation:

$$\epsilon s = 360 \times Sv \times Tz/2$$

wherein "360" represents a movement angle (unit: degree) corresponding to one turn of the spindle.

* * * * *